United States Patent [19]
Riis

[11] Patent Number: 5,570,720
[45] Date of Patent: *Nov. 5, 1996

[54] MIXING VALVE OF SINGLE LEVER TYPE PROVIDED WITH A DEVICE FOR PREVENTING PRESSURE SHOCK AT CLOSING MOVEMENT OF THE LEVER

[75] Inventor: Voldemar Riis, Vårgårda, Sweden

[73] Assignee: Gustavsberg Vargarda Armatur AB, Sweden

[ * ] Notice: The term of this patent shall not extend beyond the expiration date of Pat. No. 5,413,144.

[21] Appl. No.: 415,691

[22] Filed: Apr. 3, 1995

Related U.S. Application Data

[62] Division of Ser. No. 162,199, filed as PCT/SE92/00445, Jun. 17, 1992, Pat. No. 5,413,144.

[30] Foreign Application Priority Data

Jun. 17, 1991  [SE]  Sweden ................................. 9101852

[51] Int. Cl.⁶ ........................... F16K 11/078; F16K 31/72
[52] U.S. Cl. .................... 137/625.17; 137/625.4; 251/54; 251/285; 251/288
[58] Field of Search ............................ 137/625.17, 625.4; 251/48, 54, 285, 288

[56] References Cited

U.S. PATENT DOCUMENTS

| | | | |
|---|---|---|---|
| 2,781,519 | 9/1952 | Marchant | 251/54 |
| 4,112,966 | 9/1978 | Carlson | 251/54 X |
| 4,610,272 | 9/1986 | Gottwald et al. | 251/288 X |
| 4,708,172 | 11/1987 | Riis | 137/625.17 |
| 4,715,406 | 12/1987 | Kress | 137/625.17 |
| 4,723,574 | 2/1988 | Bergmann et al. | 137/625.17 |
| 4,733,688 | 3/1988 | Lorch et al. | 137/454.6 |
| 4,736,772 | 4/1988 | Ostertag et al. | 137/625.17 |
| 4,768,749 | 9/1988 | Oberdorfer | 137/625.17 X |
| 4,936,347 | 6/1990 | Oracz et al. | 251/54 X |
| 5,082,023 | 1/1992 | D'Alayer de Costemore d'Arc | 251/285 X |
| 5,413,144 | 5/1995 | Riis | 137/625.17 |

FOREIGN PATENT DOCUMENTS

| | | |
|---|---|---|
| 3523350 | 1/1987 | Germany . |
| 449782 | 5/1987 | Sweden . |
| 455124 | 6/1988 | Sweden . |
| 462503 | 7/1990 | Sweden . |

Primary Examiner—John Rivell
Attorney, Agent, or Firm—Finnegan, Henderson, Farabow, Garrett & Dunner, L.L.P.

[57] ABSTRACT

A single-lever mixer valve for liquids, for example hot and cold tap water. The valve comprises a housing, which is provided with an inlet for each of said liquids and a common outlet. A lever is provided for controlling the amount and the temperature of the liquid flowing out through the outlet. The lever is connected to an actuator in the valve housing that cooperates with a valve member. The lever includes an adjustable spring loaded stop to provide a temporary increase of fluid flow when pressed against a stop surface. The actuator is provided with a built-in closing damper, including at least one sealed chamber and a movable piston for forcing an amount of fluid from the chamber via a throttling member when the lever is closed. When the fluid pressure in the chamber exceeds a certain value, the throttling member is elastically deformed and pressed progressively against a sealing face in the actuator for reduction of hydraulic shock waves related to rapid closing of the mixer valve.

5 Claims, 3 Drawing Sheets

MIXING VALVE OF SINGLE LEVER TYPE PROVIDED WITH A DEVICE FOR PREVENTING PRESSURE SHOCK AT CLOSING MOVEMENT OF THE LEVER

This is a division of application Ser. No. 08/162,199, filed as PCT/SE92/00445, Jun. 17, 1992, now U.S. Pat. No. 5,413,144.

TECHNICAL FIELD

The present invention refers to a device at mixing valves of one lever type for fluids, for example hot and cold water, and of the type that comprises a valve housing, which is provided with each an inlet and a common outlet for the liquids, an operating member for regulating the amount and the temperature of the fluid flowing out through the outlet, where the operating member is connected with a valve member cooperative actuator provided in the valve housing, whereby the actuator shows a built-in soft closing function intended to prevent too quick shut off of the value, where the soft closing function includes at least one sealed chamber that comprises a movable piston which at the closing movement of the operating member is provided to press a fluid out from the chamber via a throttling member.

THE BACKGROUND OF THE INVENTION

At a quick shut off of certain mixing valves of one lever type, in particular if the water pipes are of small dimension, it can arise a pressure chock that exposes the water work system for strong loads as well as causes noise.

Through for example SE-B-462 503 and SE-B-455 124 it is earlier known mixing valves, which are provided to build up a pressure in a provided part of the valve at a quick shut off of the valve lever, so that a certain damping resistance is obtained at the endphase of the lever, which requires added force and thereby extends the closing phase. This happens by the reason that the valve is equipped with a separate pressure chamber, that is filled up via a non-return valve when the valve opens. When closing the valve the water is pressed out from the pressure chamber through passages in the non-return valve, whereby too quick closing movements are slowed down.

These known so called soft closing mixing valves show the disadvantage that they feel inert even at a normal shut off compared to a mixer without the soft closing function. They are furthermore sensitive to impurities in the water, which may damage the parts included in the soft closing function. Moreover the whole valve begins to leak if a leakage arise in the soft closing function.

THE OBJECT OF THE INVENTION AND ITS MOST IMPORTANT CHARACTERISTICS

The object of the present invention is to achieve a mixing valve with a built-in soft closing function of the type mentioned in the introduction, which does not or in very little degree affects the closing movement at a normal shut off of the valve and influences only at a quick closing movement. This has according to the invention been achieved by the fact that the throttling member, when the pressure from the fluid is exceeding a certain value in said chamber, is provided to be pressed progressivly against a sealing face in the actuator and is hereby deformed elastically, whereby the flow passages arranged in the throttling member are reduced, so that the flow resistance increases at a quick closing movement, while the flow resistance at a slow closing movement is low.

SPECIFICATION OF THE DRAWINGS

The invention will be described in the following with reference to the enclosed drawings which shows an embodiment.

Figure 4:
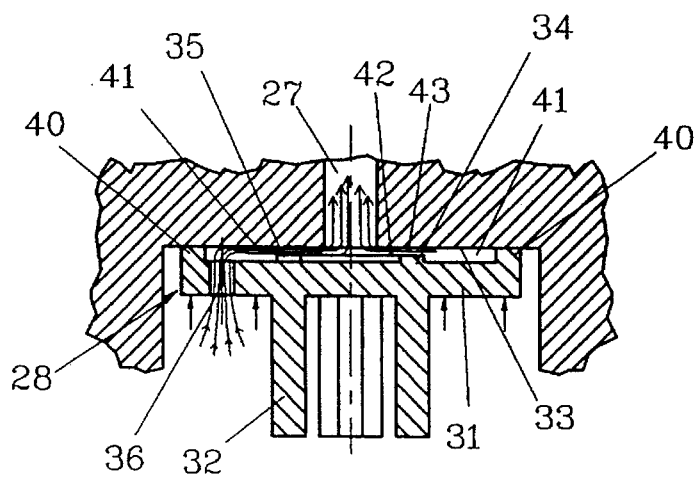
FIG. 4 shows on an enlarged scale a section through the throttling member arranged in the device, in the unaffected normal position.
Figure 5:
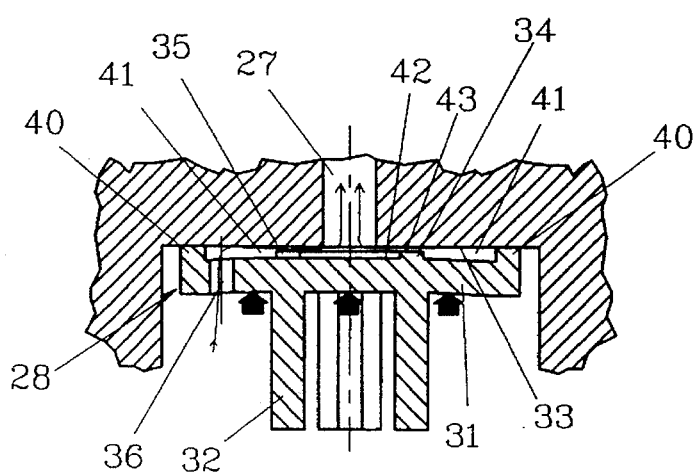

FIG. 5 discloses a cut analogous with FIG. 4 through the throttling member in affected, throttled position.

Figure 6:
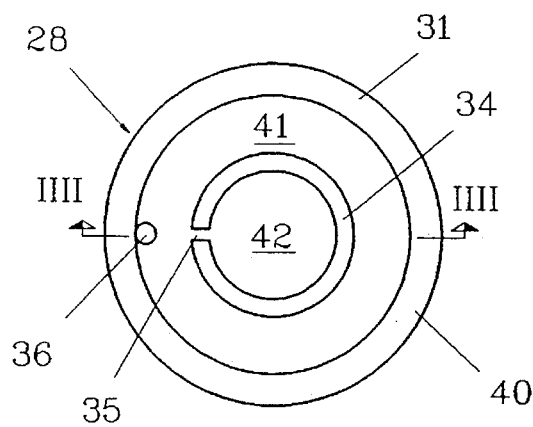

FIG. 6 discloses the throttling member in a view from the above.

DESCRIPTION OF THE EMBODIMENT

Figure 1:
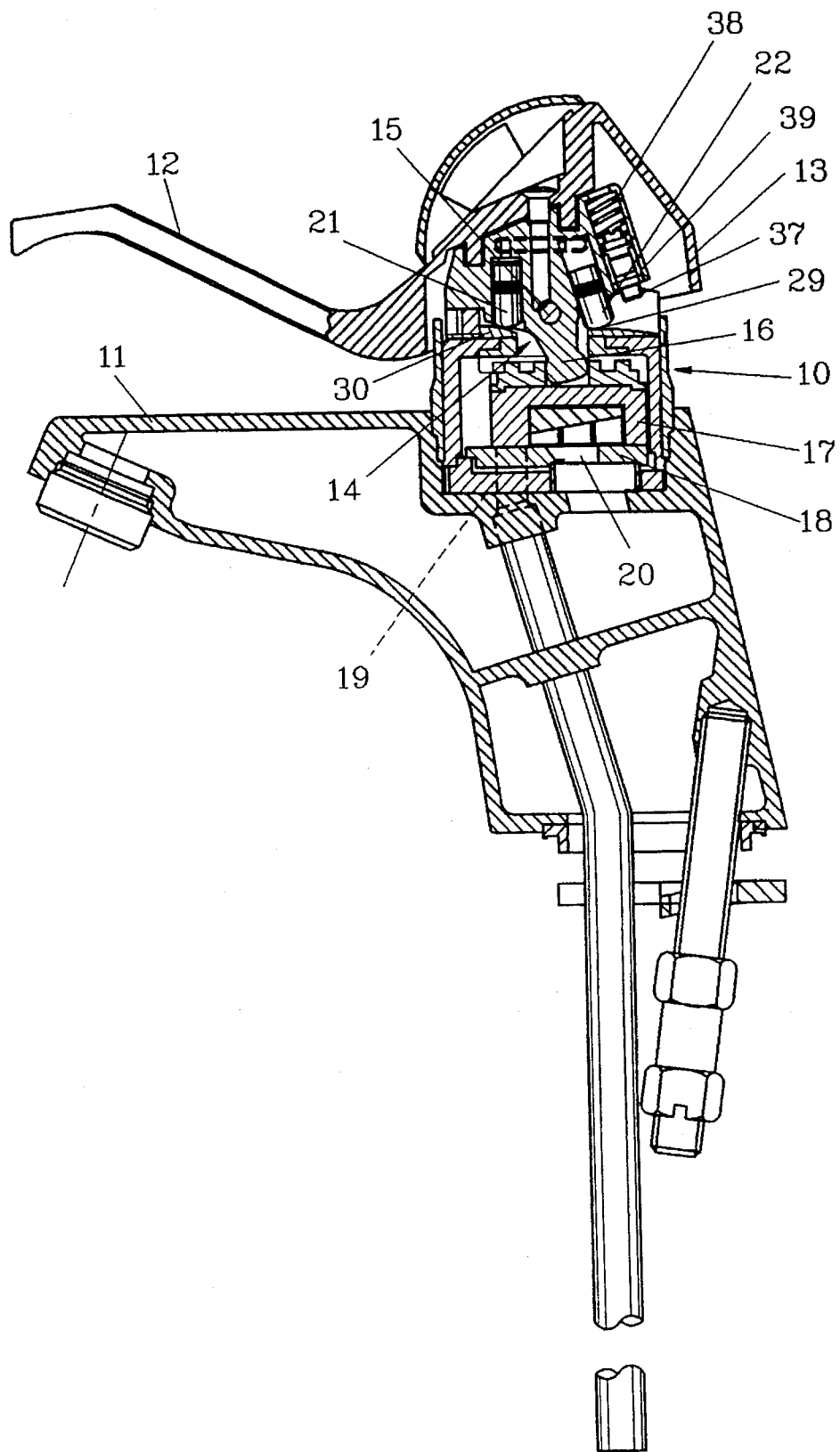
FIG. 1 is a vertical section through a mixing valve, for example a mixing valve for wash basins, equipped with the device according to the invention.

The mixing valve shown in FIG. 1 is of so called one lever type and includes a valve housing 10 with a spout 11 and a control lever 12. The upper part 13 of the valve housing 10 is by means of the control lever 12 rotateable about a vertical axis, which permits regulation of the temperature of the outflowing water. The upper part 13 of the valve housing co-operates further with an actuator 14 pivoted about a horisontal axis 15.

The lever 12 can be regarded as a double-armed lever, which is pivoted about a vertical axis as well as about a horisontal axis and whose shorter lever arm 16 constitutes a part of the actuator 14 and actuates a movable valve plate 17. This bears against another firm valve plate 18, which is provided with two inlet passages 19, of which only one of those is visible in the drawing, one for cold water and one for hot water respectively as well as an outlet passage 20, which communicates with the spout 11.

Figure 2:
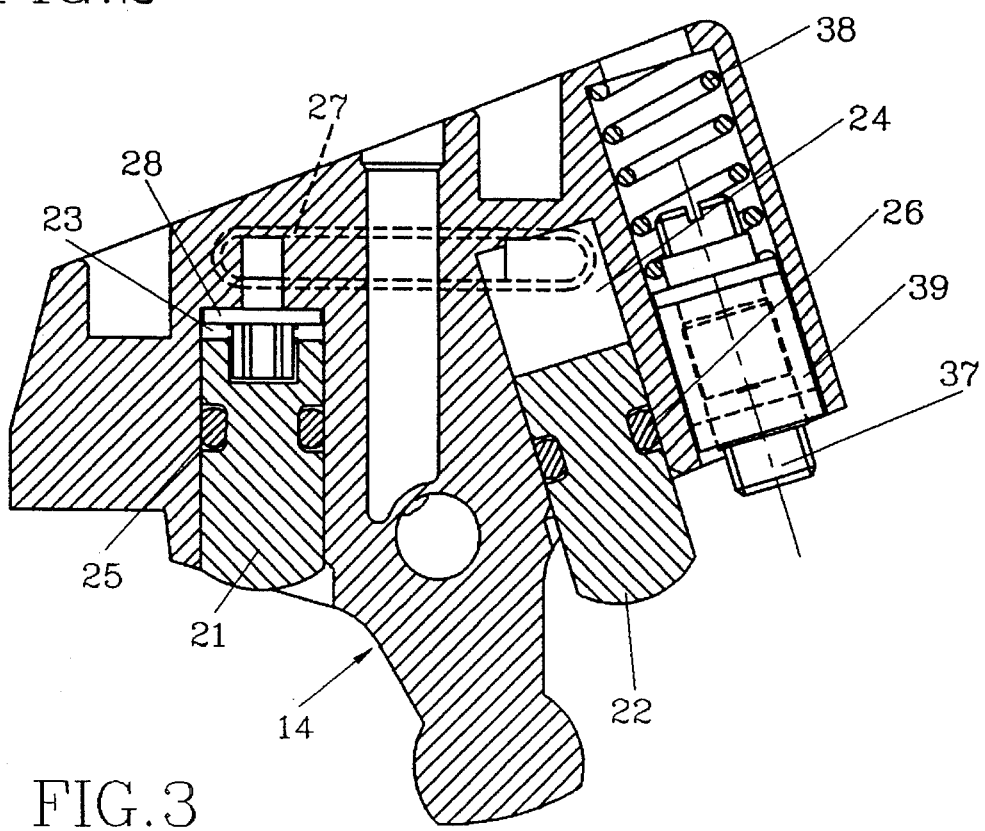
FIG. 2 shows the closed position of the valve on an enlarged scale a section through the actuator placed in the valve housing.
Figure 3:
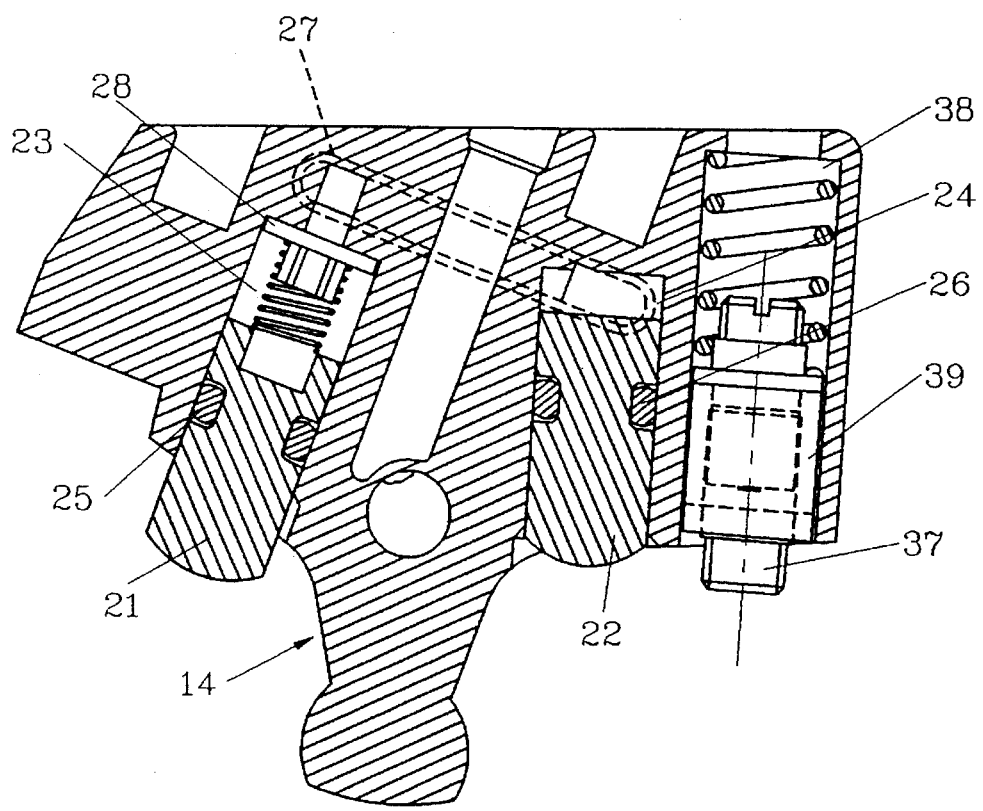
FIG. 3 is a section corresponding FIG. 2 but in the open position of the valve.

In the actuator 14 is provided a soft closing function including two pistons 21 and 22,—FIG. 2 and 3—which are slidably fitted in each a chamber 23 and 24 and sealed against these with O-rings 25 and 26 or another type of sealing. The chambers communicate with each other via a passage 27 in the actuator 14, where the passage is filled by a fluid, for example oil. Between the first chamber 23 and the passage 27 is provided a throttling member 28, which is described more in detail below.

The two pistons 21 and 22 co-operate each with a stop face 29 and 30 in the valve housing 10. When the valve is open (FIG. 3), the first piston 21 is pushed out a distance from its chamber 23, while the other piston 22 is pushed into its chamber 24. When shutting off the valve, i.e. a swing movement downwords of the lever 12, the first piston 21 will co-operate with the stop face 29 and be pressed into its chamber 23 and the fluid will be pressed out to the passage 27 and into the other chamber 24 and press out the other piston 22 via the throttling member 28 to the position shown in FIG. 2. When the valve opens, the fluid will flow in the opposite direction into the first chamber 23 via the throttling member 28.

This soft closing device is in contrary to earlier known inventions insensitive to impurities in the water, when it is not operating with the tap-water as pressure medium. Besides, the remaining function of the valve is not affected by a possible leakage in the soft closing function. At a possible functional disturbance it is only needed to change the actuator 14. By earlier known devices it is necessary to change the whole control device, which is considerably more expensive as well as more complicated and requires a shut off of the tap-water.

An example of a throttling member 28 is shown in detail in FIG. 4, 5 and 6 and includes a disc 31 equipped with a guide pin 32, which guides up the disc in the chamber 23. The disc 31 interacts with a sealing face 33 in the actuator 14 and shows on the side facing the sealing face 33 an inner, ring-shaped flange 34 provided with a radial opening 35 and an external ring-shaped flange 40. This one is axially a little higher than the inner flange 34, so in interaction with the sealing face 33 a first ring shaped space 41 and another inner space 42 inside the flange 34 are formed. The space 41 communicates with the chamber 23 via a hole 36 and the space 42 is in connection with the passage 27. Between the end surface of the inner flange 34 and the sealing face 33 is a gap 43 formed when the throttling member is in its unactivated position. The throttling member 28 is in the shown example spring loaded, but the positioning can even be done with another method.

In FIG. 4 the throttling member 28, is shown in unactivated position, i.e. when a fluid with low pressure can pass by the throttling member via the hole 36, the space 41, the passage 35 and the space 42, either at the opening movement of the valve from the chamber 23 to the passage 27 or in the contrary direction at a normal, slow closing movement. At a quick closing movement however, the pressure onto the disc 31 from the fluid in the chamber 23 will increase quick,—FIG. 5—whereby the flange 34 will be tightened against the sealing face 33 and an elastic deformation of the disc 31 occurs, so that the gap 43 between the sealing face 33 and the flange 34 is adjusted by means of the pressure in the chamber 23. Hereby the flow resistance increases in the throttling member 28 and the closing movement slows down. The throttling member 28 works progressively by this method, i.e. the faster closing movement, the bigger flow resistance and damping.

Such a progressive throttling member can naturally be designed in many different ways. The principle is however that it is elastically deformable when the pressure increases fast, caused by a quick closing movement, so that the size of the flow passages in the throttling member reduces and the closing movement slows down. The throttling member 28 can eventually be designed without the opening 35, whereby the lever movement completely stops at a quick shut off.

In the actuator 14 is further provided a stop member by means of a screw 37 fixed in a cylinder 39 which is loaded by a spring 38, that when the mixing valve opens will bear against a firm stop face which can be the same as the stop face 29. The purpose of the stop member is to limit the torsion of the actuators 14 about the axis 15 and thereby a limitation of the maximal outflow of liquid through the outlet 20. The position of the screw 37 in the cylinder 39 is adjustable for setting of increased maximal outflow.

Since the cylinder 39 with the screw 37 is mounted with a spring in the actuator 14, one can by placing the screw 37 against the stop face 29 and by pressing up the lever 12 further, temporarily increase the flow passing the stop position.

The invention is of course not limited to the embodiment shown but can be modified within the scope of the claims. Therefore the fluid can be a liquid or a gas and instead of the double piston arrangement shown, a simple single acting piston corresponding to the piston 21 can be used, for example a device affected only at the shut off of the mixing valve. The other pistons function can for example be taken over by an expandable accumulator. In this case the fluid can be air, or another gas.

I claim:

1. A single-lever mixer valve for liquids of different temperatures, comprising a housing which is provided with an inlet for each of said liquids and a common outlet, and a lever for controlling the amount and the temperature of the liquid flowing out through said outlet, an actuator, connected to said lever, provided in the housing and a valve member in the housing cooperating with said actuator, said actuator having a built-in closing damper for reducing hydraulic shock resulting from rapid closing of the mixer valve, said closing damper including at least one sealed chamber containing a fluid, a piston movable in said chamber, and a throttling member defining flow passages for said fluid, said piston adapted to force the fluid from the sealed chamber via said throttling member when the lever closes the mixer valve, said throttling member adapted to be deformed elastically when the fluid pressure in said chamber exceeds a predetermined value to cause a progressive reduction of the flow passages of the throttling member so that resistance to flow of the fluid increases at a fast-closing movement of the lever, while the resistance to flow of the fluid remains low at a slow-closing movement of the lever, said actuator further including a stop part and a stop surface positioned to cooperate with said stop part for limiting the maximum amount of liquid flowing out through said outlet, and wherein the stop part includes a spring loaded screw which is adapted to retract and provide a temporary increase of the flow of liquids through said outlet when being pressed against the stop surface.

2. A single-lever mixer valve for liquids of different temperatures, comprising a housing which is provided with an inlet for each of said liquids and a common outlet, and a lever for controlling the amount and the temperature of the liquid flowing out through said outlet, an actuator, connected to said lever, provided in the housing and a valve member in the housing cooperating with said actuator, said actuator having a built-in closing damper for reducing hydraulic shock resulting from rapid closing of the mixer valve, said closing damper including at least one sealed chamber containing a fluid, a piston movable in said chamber, and a throttling member defining flow passages for said fluid, said piston adapted to force the fluid from the sealed chamber via said throttling member when the lever closes the mixer valve, said throttling member adapted to be deformed elastically when the fluid pressure in said chamber exceeds a predetermined value to cause a progressive reduction of the flow passages of the throttling member so that resistance to flow of the fluid increases at a fast-closing movement of the lever, while the resistance to flow of the fluid remains low at a slow-closing movement of the lever, said actuator further including a stop part and a stop surface positioned to cooperate with said stop part for limiting the maximum amount of liquid flowing out through said outlet, and wherein the stop part includes a spring loaded screw which is adapted to retract and provide a temporary increase of the flow of liquids through said outlet when being pressed against the stop surface, and the position of said spring loaded screw is adjustable to set said maximum amount of liquids flowing out through said outlet.

3. A single-lever mixer valve for liquids of different temperatures, comprising a housing which is provided with an inlet for each of said liquids and a common outlet, and a lever for controlling the amount and the temperature of the liquid flowing out through said outlet, an actuator connected to said lever, and a valve member cooperating with said actuator, said actuator including a stop part cooperating with a stop surface for limiting the maximum outflow of liquid through said outlet, the stop part including a spring loaded screw which is adapted to retract and provide a temporary increase of the flow of liquids when being pressed against the stop surface.

4. A single-lever mixer valve according to claim 3, wherein the position of said spring loaded screw is adjustable to vary the occurrence of contact between the spring loaded screw and the stop surface.

5. A single-lever mixer valve for liquids of different temperatures, comprising a housing which is provided with an inlet for each of said liquids and a common outlet, and a lever for controlling the amount and the temperature of the liquid flowing out through said outlet, an actuator connected to said lever, and a valve member cooperating with said actuator, said actuator including a stop part cooperating with a stop surface for limiting the maximum outflow of liquid through said outlet, a channel, a spring in said channel, and a threaded sleeve movable in said channel against the force of the spring, the stop part including a spring-loaded screw in said sleeve adapted to retract and provide a temporary increase of the flow of liquids when being pressed against the stop surface and which is adjustably set in said sleeve so that the position of said spring-loaded screw is adjustable to vary the occurrence of contact between the spring-loaded screw and the stop surface.

* * * * *